United States Patent

Charles

[15] 3,691,294

[45] Sept. 12, 1972

[54] PACKAGE FOR ENCAPSULATED ELECTRICAL COMPONENTS

[72] Inventor: Joseph T. Charles, Mount Prospect, Ill.

[73] Assignee: Coil Sales, Inc., Arlington Heights, Ill.

[22] Filed: Oct. 5, 1970

[21] Appl. No.: 78,630

Related U.S. Application Data

[63] Continuation-in-part of Ser. No. 877,384, Nov. 17, 1969, abandoned.

[52] U.S. Cl. ..................178/46, 220/23.4, 206/65 F, 150/52 R, 336/65, 336/96

[51] Int. Cl. .....H01f 17/08, H01f 15/02, H01f 27/04

[58] Field of Search.............................338/232–233; 336/90, 96, 185, 65; 178/45, 46; 211/162, 41; 206/65 F; 150/52 R; 220/23.4

[56] References Cited

UNITED STATES PATENTS

| | | | |
|---|---|---|---|
| 2,692,302 | 10/1954 | Graves | 178/46 |
| 2,889,523 | 6/1959 | Henderson | 336/90 |
| 3,349,405 | 10/1967 | Wright | 343/872 X |
| 2,949,182 | 8/1960 | Williams | 206/65 F |
| 2,587,707 | 3/1952 | Dever | 191/12 R |

FOREIGN PATENTS OR APPLICATIONS

| | | | |
|---|---|---|---|
| 1,342,977 | 7/1963 | France | 336/90 |

*Primary Examiner*—Herman Karl Saalbach
*Assistant Examiner*—Marvin Nussbaum
*Attorney*—Wolfe, Hubbard, Leydig, Voit & Osann, Ltd.

[57] ABSTRACT

A package for holding a plurality of encapsulated electrical components comprising a cylindrical case having a lengthwise slot through which the leads of the components extend, and an adjustable mounting means carried by the case which is offset from the lengthwise slot.

11 Claims, 7 Drawing Figures

INVENTOR.
JOSEPH T. CHARLES
BY Johnson Dienner Emrich Verbeck & Wagner
ATTY

INVENTOR.
JOSEPH T. CHARLES
BY Johnson, Dienner, Emrich, Verbeck & Wagner
ATTY

INVENTOR.
JOSEPH T. CHARLES
BY
ATTY

PACKAGE FOR ENCAPSULATED ELECTRICAL COMPONENTS

This is a continuation-in-part application of my co-pending application, entitled "Load Coil Package With Offset Mounting" and identified as U.S. Ser. No. 877,384, now abandoned filed Nov. 17, 1969.

BACKGROUND OF THE INVENTION

1. Field of the Invention

This invention relates to an improved package for encapsulated electrical components, and more particularly, an improved package for encapsulated electrical components used in conjunction with voice frequency cables.

2. Description of Prior Art

To improve the electrical characteristics of cables, such as voice frequency cables used in the telephone communication systems, the cables are spliced at selected intervals and connected with various electrical components, such as load coils. These components are spliced in series with the conductors of a cable at access enclosures or buried plant pedestals, which are generally small and inaccessible. Because of these space limitations it is common practice to encase the plurality of electrical components in one package and then to encapsulate the entire package for protection. One undesirable consequence of encapsulating the entire package is that if one component becomes faulty the entire package must be replaced.

Heretofore, encapsulated electrical components mounted within the enclosure had their terminals disposed vertically relative to the mount centers of the package, so that the terminals were not presented conveniently to the installer. Thus, it was necessary for the installer to "reach around" in the enclosure to make the required splice connections between the cables and the terminals.

Moreover, presently available encapsulated packages have fixed mounting centers and since a plurality of packages are mounted within the same enclosure, each package being mounted separately, it is sometimes difficult to align the mounting studs of the package with the mounting holes of a mounting standard within the enclosure.

Thus, there is a need for an improved package for encapsulated electrical components which is easier to install in access enclosures, buried plant pedestals or in other locations wherein a number of such packages are mounted in a small space.

SUMMARY OF THE INVENTION

Accordingly, this invention provides a new and improved package for encapsulated electrical components which makes installation and routine service easier and therefore, reduces costs. The package comprises a plurality of individually encapsulated electrical components enclosed in a single case which includes a slot through which the leads or terminals of the individual electrical components are accessed. In addition, an adjustable mounting arrangement is provided for the package to minimize the amount of time and effort required by the installer to mount the assembly in the access enclosure. Moreover, the mounting centers are offset rather than normal to the slot through which the coil terminals are accessed in order that the package can be oriented in such a fashion that the leads or terminals face the installer as he connects the leads to the cables. The package also includes a removable lead guard which encloses the coil leads and yet provides easy access to the leads.

DESCRIPTION OF PREFERRED EMBODIMENTS

Figure 1:
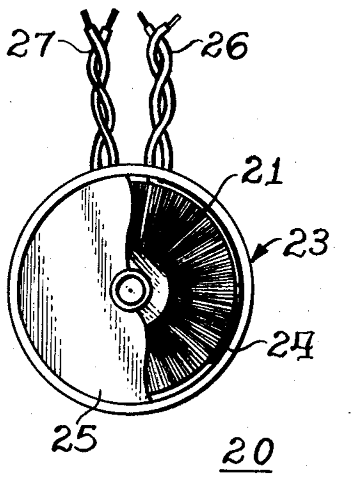
FIG. 1 is a front view of an encapsulated load coil, with the casing partially cut away to show the coil.
Figure 2:
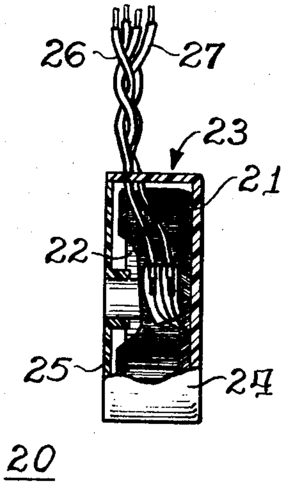
FIG. 2 is a partially sectioned side view of the coil shown in FIG. 1.

Referring to FIGS. 1 and 2, a load coil 20 includes a winding 21 wound on, as shown in FIG. 2, a magnetic core 22. The coil 21 is enclosed within a plastic case 23 which includes a body portion 24 and a cover 25. The coil 21 has two sections which are electrically equivalent so that when the coil sections are inserted in series with each side of a two-conductor cable, the impedance characteristic of the cable remains balanced and the effects of longitudinal noise are minimized. The leads of the coil are extended to the outside of the case 23 by two pair of twisted leads 26 and 27. The load coil 20 is completely self-contained and is encapsulated within its own case 23.

The load coil 20 forms no part of this invention and is used to help describe the invention. This invention resides in the package for carrying a plurality of encapsulated electrical components, such as load coil 20. For example, other encapsulated electrical components that could be encased are line built-out capacitors, line built-out lattice networks, impedance compensators and gas tube protectors. Each of these electrical components are well-known in the voice transmission field. Built-out capacitors are used to simulate the capacitance of a missing cable. A lattice network of capacitor and resistors balance the line to accommodate a mixture of wire gauges. Junction impedance compensators, which include an inductor and four capacitors, function as a compensating device for interconnecting cables of different impedance characteristics. Gas tube protectors protect load coils situated in high density lighting areas. There are of course a number of other transmission devices that could be encased in a package constructed in accordance with the principles of the invention.

Figure 3:
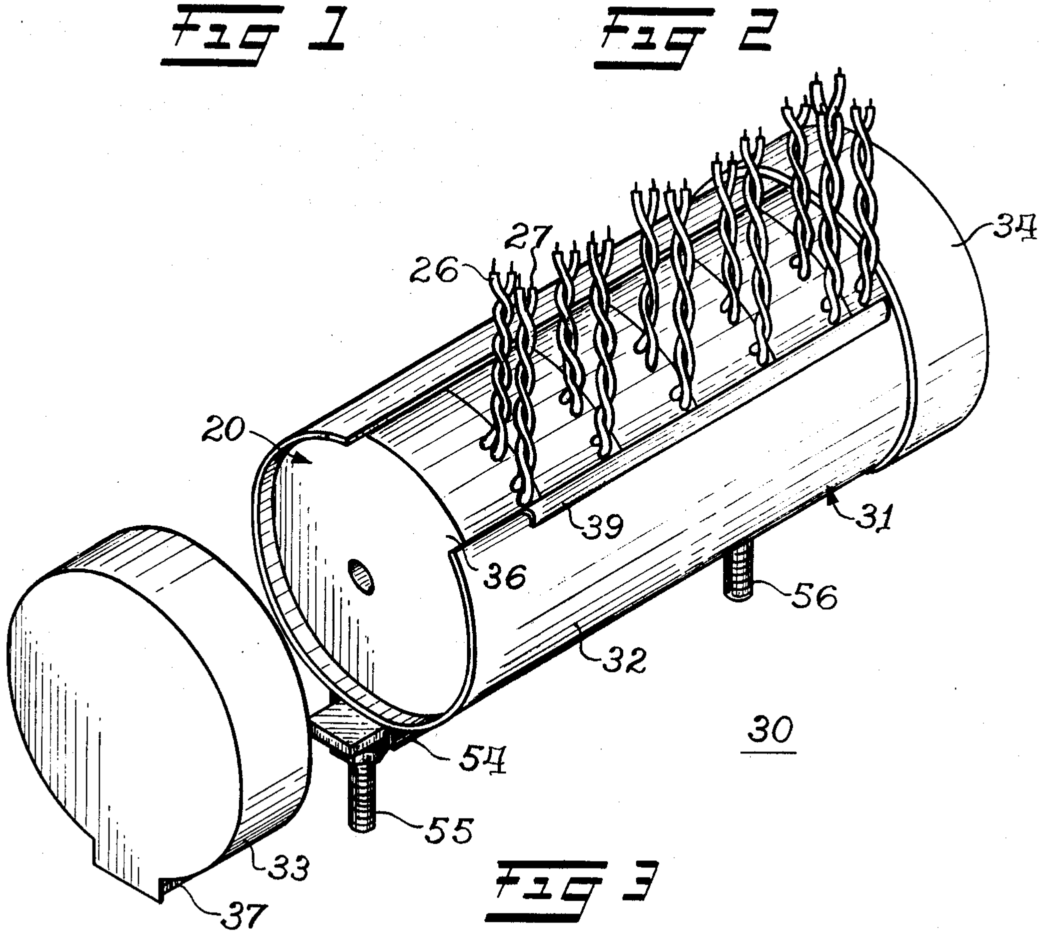
FIG. 3 is a view of a package made in accordance with the invention, partially assembled, which shows how the individual load coil terminals are offset relative to the bolts which mount the assembly.
Figures 4, 5:
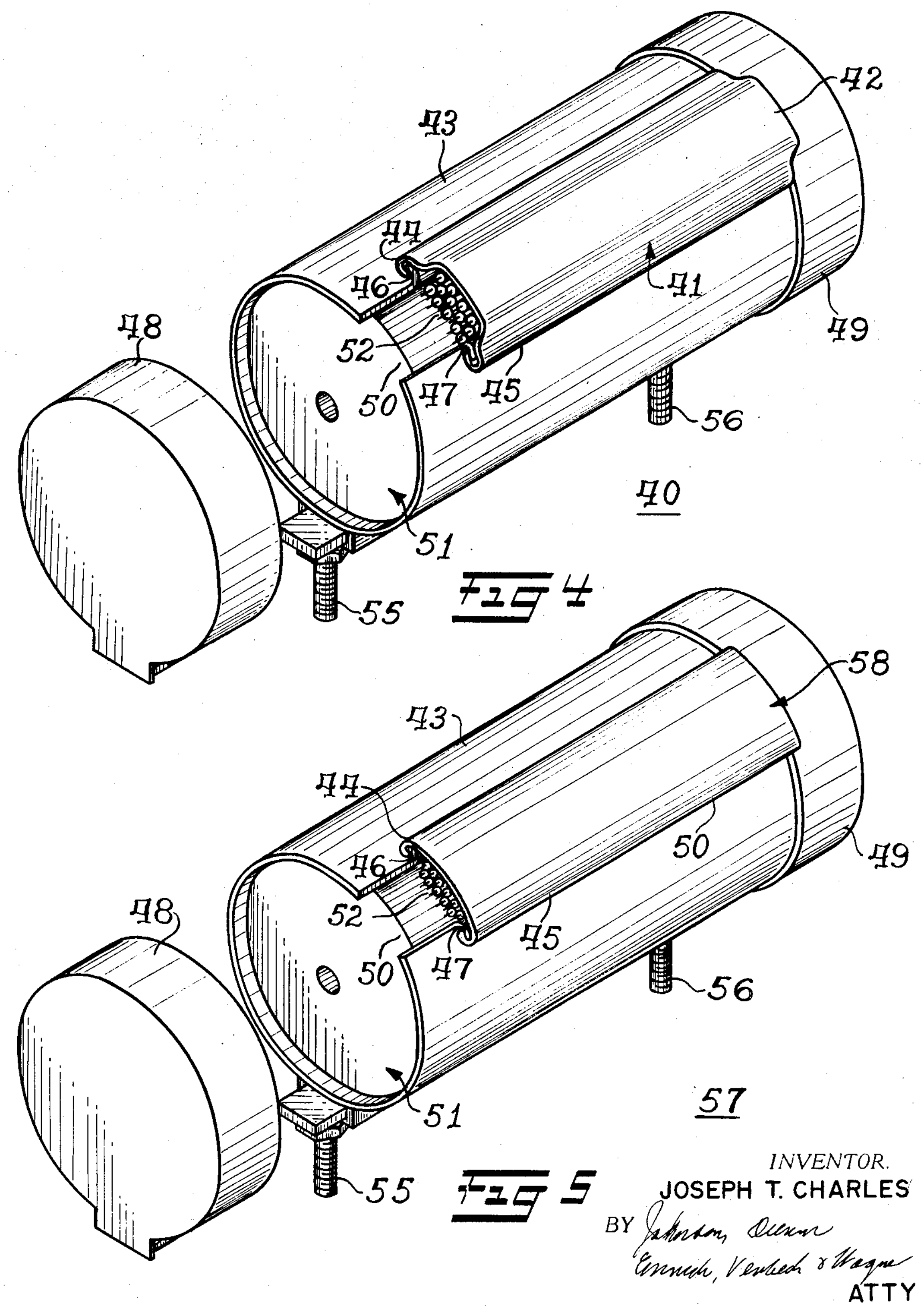
FIGS. 4 and 5 are views of a package with different embodiments of removable lead guards provided in accordance with this invention.

FIG. 3 shows a partially assembled view of a package 30 in which is contained a plurality of individually encapsulated load coils, such as coil 20 shown in FIGS 1 and 2, in an end-to-end relation. The coils are contained within a hollow cylindrical plastic case 31 which includes a main body portion 32 and two end covers 33 and 34. With one of the end covers, for example cover 33, removed, a plurality of load coils, such as coil 20, are slid into the case with the magnetic cores of the coils, aligned along the central axis of the case 31. The case 31 has a slot 36 which extends along a line parallel to the central axis of the case 31 for providing access to the coils contained within the case. The slot 36 is long enough to permit the leads of all the load coils to be passed through the slot to the outside of the case and routed to one end thereof as shown in FIG. 4, whereby electrical connections can be made to the coils.

The case is of a flexible elastic material, for example, plastic, so that if it is necessary to replace any one of the coils, such as coil 20, the coil 20 can be quickly removed from the case by pulling the coil through the slot 36 without removing the end covers 33 and 34. To facilitate this technique for coil replacement, the width of the slot 36 is made approximately five to ten per cent less than the diameter of load coil 20. In this way, an individual coil may be serviced without disturbing any of the other coils of the assembly.

A portion of the case body 32 on one side of the slot 36 is rolled back to form a flange 39 which is used to prevent sharp bending of the lead wires 26 and 27 of the coils. For mounting the package 30, a mounting means is provided comprising a guide track 54 and a pair of mounting bolts 55 and 56 with square heads in sliding engagement with the guide track 54.

The position of the headed mounting bolts 55, 56 is adjustable relative to one another to simplify the mounting of the load coil assembly within the enclosure. The heads of the bolts 55 and 56, positioned within the guide track 54 are movable within the track 54 along the length of the case. Thus, the mounting centers for the package 30 are not fixed, but are adjustable whereby the mounting of the package 30, particularly in hard-to-reach locations, is made easier.

The slot 36 through which the leads of the coils pass to the outside of the case, is disposed along a line parallel to the longitudinal axis of the case, and the mounting centers of the assembly as defined by the longitudinal axis of bolts 55 and 56, are offset relative to a line which lies in a plane which passes through the longitudinal axis of the case and the center of the slot 36. Thus, when the package 30 is bolted to a mounting standard (not shown), the coil leads will always be facing the installer.

Each end such as cover 33 includes a guide member 37 which engages the mounting guide track 54 to position the cover 33 on the case. One or both of the end covers 33 and 34 may be permanently attached to the case body 32 by heating to form a bond between the covers 33 and 34 and the case body 32 or by using a suitable adhesive.

In FIG. 4, there is shown a second embodiment illustrated as package 40 which includes a lead guard 41. The guard 41 includes hooked end portions 44 and 45 which are slidably engageable with the flanges 46 and 47, respectively, on the case 43. With an end cover 48 of the case 43 removed, the lead guard 41 is slipped over the slot 50 and the exposed portions of the coils 51, including leads 52, so that when the guard 41 is in place, the slot 50 is covered and the coils 51 are enclosed. When the cover 48 is replaced, the guard 41 is held in place by the end covers 48 and 49. Through the use of the removable lead guard 41, the coil leads 52 are protected and yet can be quickly exposed by removing an end cover, such as 48, and sliding off the lead guard 41.

The center portion 42 of the lead guard 41 is bowed away from main body of the case 43 to accommodate a plurality of layers of wires, shown generally at 52. The installer may bring half of the wires out from the end of the guard 41 adjacent cover 48, or the end adjacent cover 49. Package 40 also includes mounting members 55–56 which provides adjustment centers for mounting the package.

A third embodiment of a package constructed in accordance with the present invention is shown in FIG. 5. The package 57 is similar to the package 40 of FIG. 4 but uses a flat lead guard 50. Case 43 and covers 48 and 49 and other features of the package 57 that are similar to those of the package 40 of FIG. 4 have been given the same reference numeral. The flat lead cover 58 is generally used when only a few load coils are encased and fewer leads 60 are to be protected.

Figure 6:
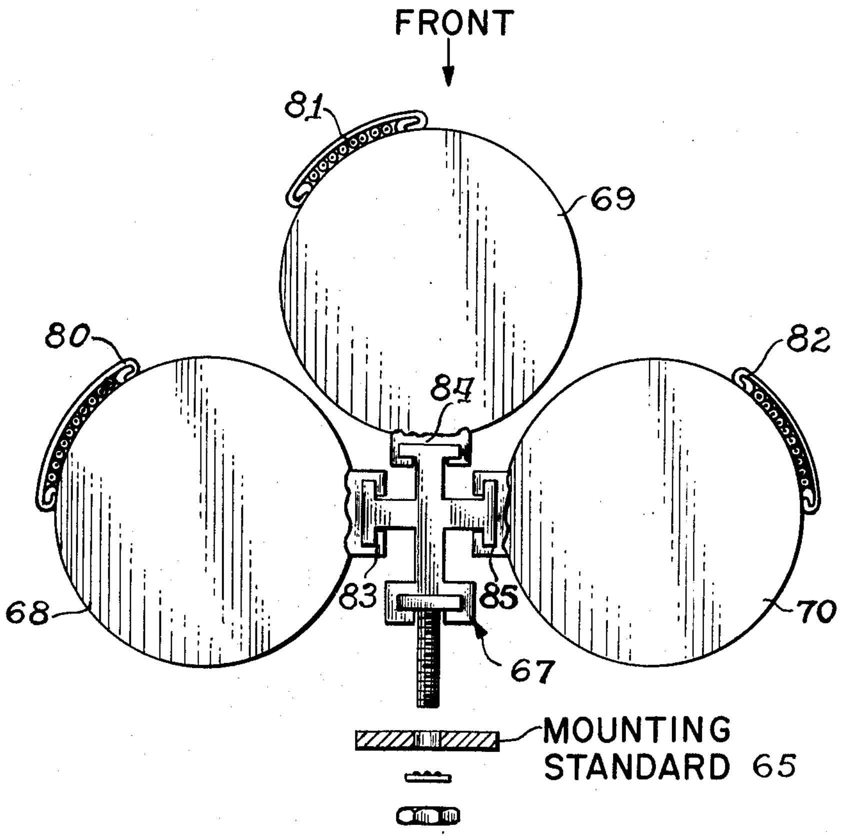
FIG. 6 shows a mounting arrangement for a plurality of packages.
Figure 7:
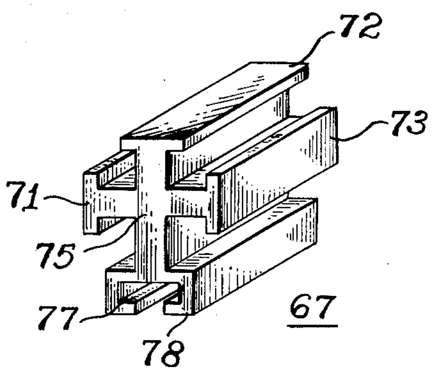
FIG. 7 shows a mounting bar for use in the arrangement shown in FIG. 6.

Referring to FIG. 6, there is shown an arrangement for mounting three packages 68, 69 and 70, to a standard 65, through the use of a mounting bar 67, shown in FIG. 7. Load coil packages 68–70 may be similar to assemblers 40, and 57 described above and include lead guards 80–82 or may be without lead guards as is the load coil package 30 of FIG. 3.

The mounting bar 67, which may be aluminum, is formed with "T-shaped members" 71, 71 and 73, formed integrally on junction 75. The dimensions of the "T-shaped" members 71-73 are commensurate with the dimensions of the guide tracks 83, 84 and 85 of the cases of packages 68–70, respectively. The mounting bar 67 includes a track 77 formed by a "C-shaped" channel member 78 formed integrally with the mounting bar 67. The mounting bar 67 permits three packages 68–70 to be held together and be mechanically interconnected and mounted on a standard 65 as a single assembly by the use of the headed bolts slidably movable in track 77. Only one mounting bar 67 is required to hold the three packages 68–70 together. The mounting bar 67 could be modified to hold more than three packages together for mounting.

As can be seen in the front view of the assembly shown in FIG. 6, when the load coil packages 68–70 are mounted together by means of bar 67, the lead access areas, indicated by lead guards 80, 81 and 82 of the load coil packages 68–70, are all disposed so as to be readily accessible from the front of the access enclosure.

I claim:

1. A package for encasing a plurality of encapsulated electrical components each having at least a pair of leads, comprising: an elongated hollow case adapted to receive a plurality of said electrical components in an end-to-end relation, said case having a continuous slot extending along a first line parallel to the longitudinal axis of said case between its enclosed ends for passing said leads to the outside of said case and having means for permitting removal of individual electrical components from said case, and means on the outside of said case for mounting the package, said mounting means disposed along a second line parallel to the longitudinal axis of said case and offset from a plane passing through said first line and the longitudinal axis of said case, said mounting means including a guide track and at least a pair of mounting studs having an enlarged head slidably supported in said guide track, said mounting studs including a locking nut for locking said studs in place.

2. In a telephone communication system including voice frequency cables and electrical components connected to the cables at selected intervals for improving the voice transmission therethrough, the improvement comprising a plurality of individual disk-shaped encapsulated electrical components each having at least a pair of leads connected to the voice frequency cables at the selected intervals, an elongated hollow cylindrical, flexible, elastic case having a diameter slightly greater than the diameter of said disk-shaped components for receiving said components in electrical disconnected relationship, said case having a continuous slot extending along a first line parallel to its longitudinal axis for passing said leads to the outside of said case for connection to the voice frequency cables and a pair of end caps fitted in telescoping relation over the ends of the case, the width of the slot and the elasticity of the flexible case cooperating to permit the separate manual removal of an individual selected electrical component from said case through the slot by pulling apart each side of the slot adjacent the electrical component being removed, said end caps providing sufficient support to hold the other electrical components within said case while the selected component is being removed.

3. The telephone communication system of claim 2 which includes means on the outside of said case for mounting the case, said mounting means disposed along a second line parallel to the longitudinal axis of said case and offset from a plane passing through said first line and the longitudinal axis of said case.

4. The telephone communication system of claim 2 which includes a removable lead guard for at least partially closing said slot and for guiding said leads toward one end of said case.

5. A package for encasing a plurality of disk-shaped encapsulated electrical components each having at least a pair of leads, comprising a hollow cylindrical case having a diameter slightly greater than the diameter of said disk-shaped components, said case having a continuous slot extending between its enclosed ends along a first line parallel to its longitudinal axis for passing said leads to the outside of said case and having means for permitting removal of individual electrical components from said case, and means on the outside of said case for mounting the package, said mounting means disposed along a second line parallel to the longitudinal axis of said case and offset from a plane passing through said first line and the longitudinal axis of said case, said mounting means including a guide track and at least a pair of mounting studs having an enlarged head slidably supported in said guide track, said mounting studs including a locking nut for locking said studs in place.

6. An assembly of electrical component packages adapted to be mounted to a mounting standard comprising a plurality of electrical component packages, each of said packages including a case adapted to contain a plurality of electrical components and a guide track secured to said case, a mounting bar having a plurality of T-shaped members which can be slidably engaged in said guide track of said cases, and means for fastening said mounting bar to said mounting standard.

7. In a telephone communication system including voice frequency cables and electrical components connected to the cables at selected intervals for improving the voice transmission therethrough, the improvement comprising a plurality of individual encapsulated electrical components each having at least a pair of leads connected to the voice frequency cables at the selected intervals, an elongated hollow, flexible, elastic case holding said electrical components in electrical disconnected relationship and in an end-to-end relation, said case having a continuous slot extending parallel to the longitudinal axis of the case through which the leads of said electrical components project for connection to the voice frequency cables and a pair of end caps fitted in telescoping relation over the ends of said case, the width of the slot and the elasticity of the flexible case cooperating to allow a selected electrical component to be manually removed through the slot by pulling apart each side of the slot adjacent the electrical component being removed, said end caps providing sufficient support to hold the other electrical components within said case while the selected electrical component is being removed.

8. The telephone communication system of claim 7 wherein at least one of said end caps is permanently attached to the case.

9. The telephone communication system of claim 7 wherein a flange is positioned adjacent each side of the continuous slot and said lead guard is positioned adjacent the flanges in a slidable relationship.

10. The telephone communication system of claim 7 which includes means on the outside of said case for mounting the case, said mounting means disposed along a line parallel to the longitudinal axis of said case and offset from the longitudinal axis of the continuous slot.

11. The telephone communication system of claim 7 which includes a manually removable lead guard for at least partially closing said slot and for guiding said leads toward one end of said case.

* * * * *